US009680541B2

United States Patent
Jiang et al.

(10) Patent No.: US 9,680,541 B2
(45) Date of Patent: Jun. 13, 2017

(54) METHODS AND APPARATUSES FOR CHANNEL ESTIMATION AND FEEDBACK IN A THREE-DIMENSIONAL MULTIPLE INPUT AND MULTIPLE OUTPUT SYSTEM

(71) Applicant: NEC (CHINA) CO., LTD., Beijing (CN)

(72) Inventors: Chuangxin Jiang, Beijing (CN); Chaofeng Li, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 0 days.

(21) Appl. No.: 14/911,753

(22) PCT Filed: Aug. 13, 2013

(86) PCT No.: PCT/CN2013/081371
§ 371 (c)(1),
(2) Date: Feb. 12, 2016

(87) PCT Pub. No.: WO2015/021596
PCT Pub. Date: Feb. 19, 2015

(65) Prior Publication Data
US 2016/0191128 A1 Jun. 30, 2016

(51) Int. Cl.
*H04L 1/02* (2006.01)
*H04B 7/0456* (2017.01)
(Continued)

(52) U.S. Cl.
CPC ......... *H04B 7/0456* (2013.01); *H04B 7/0417* (2013.01); *H04B 7/0626* (2013.01);
(Continued)

(58) Field of Classification Search
CPC ....... H04L 1/0618; H04L 5/0023; H04L 1/16; H04B 7/0469; H04B 7/0478
(Continued)

(56) References Cited

U.S. PATENT DOCUMENTS 9,319,120 B2 * 4/2016 Nagata ................. H04B 7/0456
2015/0222340 A1 * 8/2015 Nagata ................. H04W 16/28
375/267
(Continued)

FOREIGN PATENT DOCUMENTS

CN 103152140 A 6/2013
CN 103209012 A 7/2013
(Continued)

OTHER PUBLICATIONS

International Search Report for PCT/CN2013/081371 dated May 23, 2014.

*Primary Examiner* — Khai Tran
(74) *Attorney, Agent, or Firm* — Sughrue Mion, PLLC

(57) ABSTRACT

Embodiments of the present disclosure relate to methods and apparatuses for channel estimation and feedback in a three dimensional multiple input multiple output (3D-MIMO) system. A method may comprise: transmitting a plurality of reference signals for a plurality of columns in an antenna array; receiving indication information on configuration adjustment of a precoding information feedback, wherein the indication information is based on measurement on the plurality of reference signals; and adjusting a configuration of the precoding information feedback based on the indication information so that a multiple vertical precoding information feedback is enabled when it can obtain a performance gain. Especially, the multiple vertical precoding information feedback may represent feeding back a plurality of vertical precoding matrix indicators for the plurality of columns in the antenna array. In embodiments of the present disclosure, there is provided a new solution for channel estimation and feedback in a 3D-MIMO system, and it may achieve a more accurate beamforming and/or a higher order (Continued)

spatial multiplexing, thereby improving the performance of the 3D-MIMO system.

17 Claims, 12 Drawing Sheets

(51) Int. Cl.
*H04L 1/06* (2006.01)
*H04L 1/00* (2006.01)
*H04B 7/06* (2006.01)
*H04B 7/0417* (2017.01)
*H04L 25/02* (2006.01)

(52) U.S. Cl.
CPC ......... *H04B 7/0639* (2013.01); *H04L 1/0026* (2013.01); *H04L 1/06* (2013.01); *H04L 25/0226* (2013.01)

(58) Field of Classification Search
USPC ........ 375/267, 260, 347, 349; 455/424, 432, 455/445
See application file for complete search history.

(56) References Cited

U.S. PATENT DOCUMENTS

2015/0318909 A1\* 11/2015 Zhang .................. H04B 7/0413
375/267
2016/0173244 A1\* 6/2016 Ding ..................... H04L 5/0023
370/329

FOREIGN PATENT DOCUMENTS

CN 103220026 A 7/2013
WO 2013/024350 A2 2/2013

\* cited by examiner

US 9,680,541 B2

METHODS AND APPARATUSES FOR CHANNEL ESTIMATION AND FEEDBACK IN A THREE-DIMENSIONAL MULTIPLE INPUT AND MULTIPLE OUTPUT SYSTEM

CROSS REFERENCE TO RELATED APPLICATIONS

This application is a National Stage of International Application No. PCT/CN2013/081371 filed Aug. 13, 2013, the contents of which are incorporated herein by reference in their entirety.

FIELD OF THE INVENTION

Embodiments of the present disclosure generally relate to wireless communication techniques and more particularly relate to methods and apparatuses for channel estimation and feedback in a three-dimensional multiple input multiple output (3D-MIMO) system.

BACKGROUND OF THE INVENTION

With the constant increase of mobile data services and emergence of new-type applications, the 3rd Generation Partnership Project (3GPP) organization has developed long-term evolution (LTE) specifications and LTE-Advanced (LTE-A) specifications. As the next generation cellular communication standard, an LTE or LTE-Advance system can operate in both Frequency Division Duplex (FDD) mode and Time Division Duplex (TDD) mode.

To meet constantly increasing requirements on data rate and the spectrum efficiency, there was proposed Multiple Input Multiple Output (MIMO) technology to improve the network performance. The MIMO technology means the use of multiple antennas at both the transmitter and receiver to improve communication performance. Recently, the MIMO technology has attracted much attention in wireless communications, because it could offer significant increases in both data throughput and link range without additional bandwidth or increased transmit power. Moreover, the MIMO technology has become a key feature of the LTE/LTE-A system.

Currently, it is known that one-dimensional antenna array can provide a flexible beam adaption in horizontal plane by a horizontal precoding process while a down-tilt is applied in a vertical domain. However, it has been recently found that a full MIMO capability could also be exploited through leveraging a two-dimensional antenna planar such that user-specific beamforming and spatial multiplexing on the vertical domain is possible.

To help improving transmit and/or receive gains and reducing interference, it has proposed to study user-specific beamforming and full dimension MIMO (i.e., 3D MIMO) with 2D antenna array (Active Antenna System, AAS).

However, the UE-specific beamforming and spatial multiplexing have not been provided in elevation domain yet, i.e. there is no vertical precoding process yet. The 3D MIMO can solve this problem with vertical precoding process. It may provide a flexible beam adaption both for a horizontal domain and a vertical domain by horizontal and vertical precoding process, respectively.

In WO2013/024351 is disclosed a method of designing codebook for 3D antenna configuration. The disclosed solution mainly relates to codebook design, and in this discourse, there are designed two codebooks, i.e., a horizontal codebook and a vertical codebook, which correspond to the horizontal domain and the vertical domain respectively. For each row/column in the antenna array, the same codeword could be used to quantize corresponding horizontal/vertical channel state information. A user equipment (UE) feeds back Precoding Matrix Indicators (PMIs) from the horizontal and vertical codebooks respectively and at an evolved node B (eNB), the 3D precoding matrix will be composed from the two PMIs.

In a Chinese patent application publication No. CN102938688A, there is disclosed a solution for channel measurement and feedback of a multi-dimensional antenna array, in which an eNB will send two types of reference signals corresponding to a horizontal reference signal and a vertical reference signal in the same subframe or in different subframes and the UE receives the two types of reference signals from eNB and measures and feeds back two classes CSI corresponding horizontal CSI and vertical CSI to the eNB.

Besides, in 3GPP document R1-112420 entitled "Considerations on CSI feedback enhancements for high-priority antenna configurations", there is specified how to form 3D precoding matrix by horizontal precoding matrix and vertical precoding matrix. For a purpose of illustration, FIG. 1 illustrates a schematic diagram of the solution as disclosed in the documents. As illustrated in FIG. 1, the vertical CSI-RS and horizontal CSI-RS are transmitted to the UE in subframe 1 and two 4Tx PMIs selection and feedback for horizontal CSI and vertical CSI will be received from the UE respectively. Then, the eNB may reconstruct the CSI based on horizontal and vertical PMIs by means of extrapolation.

SUMMARY OF THE INVENTION

However, the solutions in the prior art have their own drawbacks. Particularly, these solutions might introduce performance loss. Therefore, there is a need for an improved scheme for channel estimation and feedback for a 3D-MIMO system.

In view of the foregoing, the present disclosure provides a new solution for channel estimation and feedback in a 3D MIMO system so as to solve or at least partially mitigate at least a part of problems in the prior art.

According to a first aspect of the present disclosure, there is provided a method for channel estimation and feedback in a 3D MIMO system. The method may comprise: transmitting a plurality of reference signals for a plurality of columns in an antenna array; receiving indication information on configuration adjustment of a precoding information feedback, wherein the indication information is based on measurement on the plurality of reference signals; and adjusting a configuration of the precoding information feedback based on the indication information so that a multiple vertical precoding information feedback is enabled when it can obtain a performance gain, wherein the multiple vertical precoding information feedback represents feeding back a plurality of vertical precoding matrix indicators for the plurality of columns in the antenna array.

According to a second aspect of the present disclosure, there is also provided a method for channel estimation and feedback in a 3D MIMO system. The method may comprise: receiving a plurality of reference signals for a plurality of columns in an antenna array; performing a measurement on the plurality of reference signals; and transmitting, based on the measurement, indication information on configuration adjustment of a precoding information feedback.

According to a third aspect of the present disclosure, there is also provided an apparatus for channel estimation and feedback in a 3D MIMO system. The apparatus may comprise: a signal transmission unit configured to transmit a plurality of reference signals for a plurality of columns in an antenna array; an information receiving unit configured to receive indication information on configuration adjustment of a precoding information feedback, wherein the indication information is based on measurement on the plurality of reference signals; and a configuration adjustment unit configured to adjust a configuration of the precoding information feedback based on the indication information so that a multiple vertical precoding information feedback is enabled when it can obtain a performance gain, wherein the multiple vertical precoding information feedback represents feeding back a plurality of vertical precoding matrix indicators for the plurality of columns in the antenna array.

According to a fourth aspect of the present disclosure, there is also provided an apparatus for channel estimation and feedback in a 3D MIMO system. The apparatus may comprise a reference signal receiving unit configured to receive a plurality of reference signals for a plurality of columns in an antenna array; a signal measurement performing unit configured to perform a measurement on the plurality of reference signals; and an indication information transmission unit configured to transmit, based on the measurement, indication information on configuration adjustment of a precoding information feedback.

According to a fifth aspect of the present disclosure, there is further provided, a computer-readable storage media with computer program code embodied thereon, the computer program code configured to, when executed, cause an apparatus to perform actions in the method according to any one of embodiments of the first aspect.

According to a sixth aspect of the present disclosure, there is further provided, a computer-readable storage media with computer program code embodied thereon, the computer program code configured to, when executed, cause an apparatus to perform actions in the method according to any one of embodiments of the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

According to a ninth aspect of the present disclosure, there is provided an device for channel estimation and feedback in a three dimensional multiple input multiple output system, comprising a processor and at least one memory having computer codes stored therein, the computer codes are configured to, when executed, cause the processor to perform operations in the method according to any one of embodiments of the first aspect.

According to a tenth aspect of the present disclosure, there is provided an device for channel estimation and feedback in a three dimensional multiple input multiple output system, comprising a processor and at least one memory having computer codes stored therein, the computer codes are configured to, when executed, cause the processor to perform operations in the method according to any one of embodiments of the second aspect.

In embodiments of the present disclosure, there is provided a new solution for channel estimation and feedback in a 3D-MIMO system, and it may achieve a more accurate beamforming and/or a higher order spatial multiplexing, thereby improving the performance of the 3D-MIMO system.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Hereinafter, a method and apparatus for channel estimation and feedback in a 3D-MIMO system will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or block may represent a module, a program, or a part of code, which contains one or more executable instructions for performing specified logic functions. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

First, reference will be made to FIG. 2 to describe a diagram of an exemplary system for channel estimation and feedback in a 3D-MIMO system according to an embodiment of the present disclosure.

Figure 1:
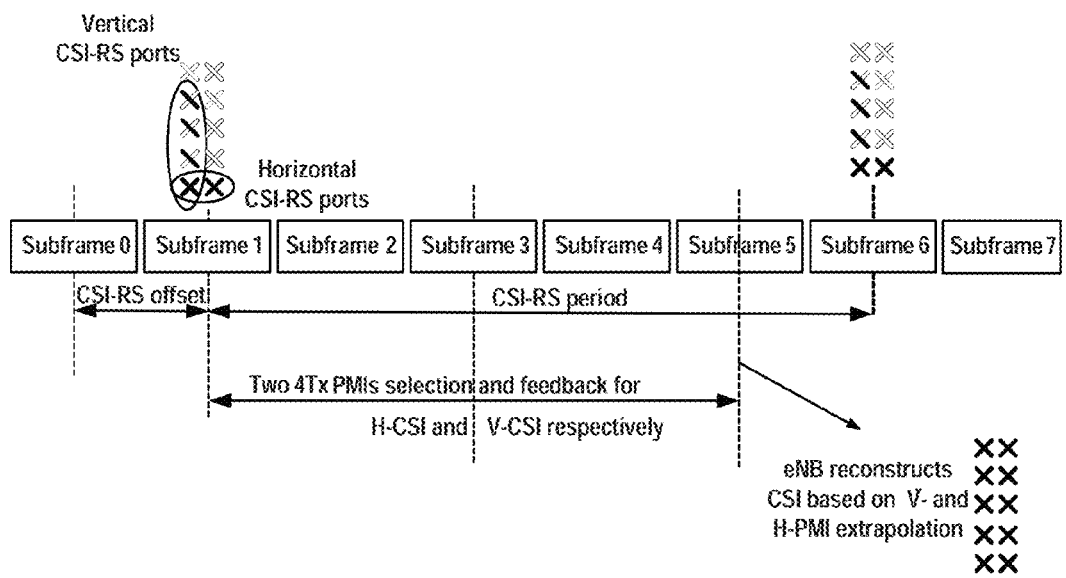
FIG. 1 schematically illustrates a diagram of a 3D precoding matrix composing in the prior art.
Figure 2:
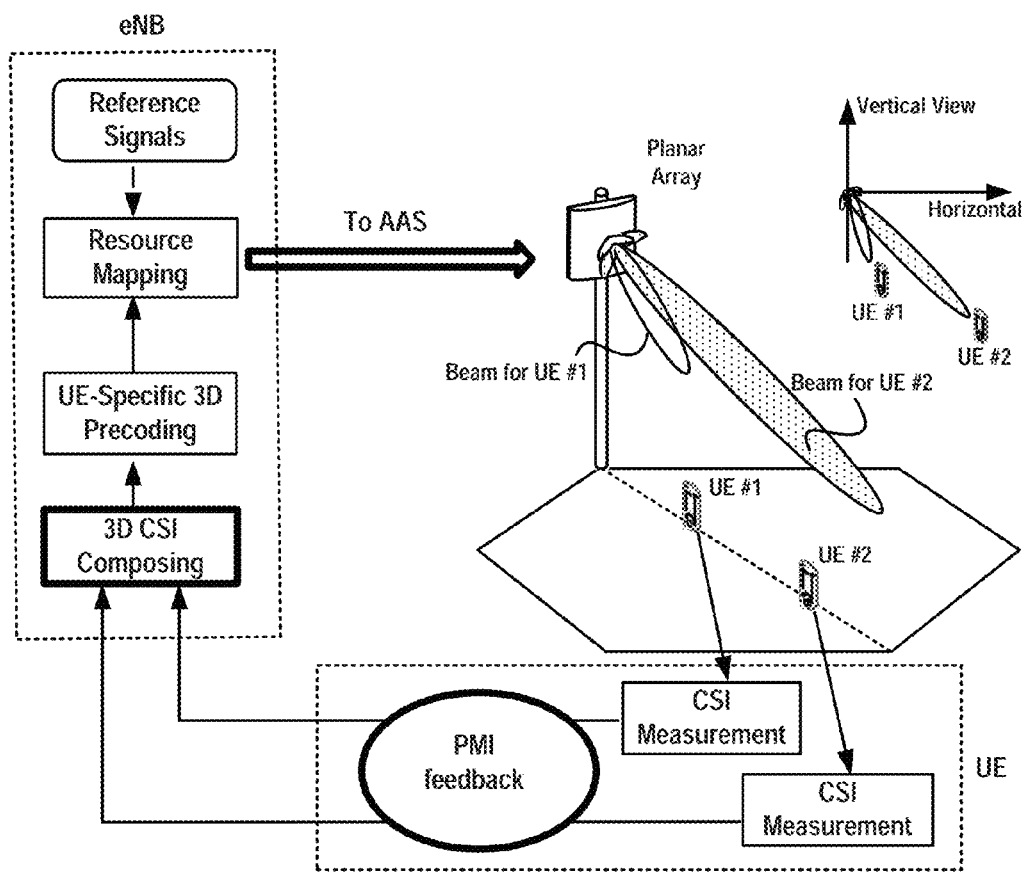
FIG. 2 schematically illustrates a diagram of an exemplary system for channel estimation and feedback in a 3D-MIMO system according to an embodiment of the present disclosure.

As illustrated in FIG. 2, the system may include an eNB for serving UEs in the cell, and two example UEs, (i.e., UE #1 and UE #2), wherein an ASS is used. According to the present disclosure, in an initialization process, after the resource mapping, the reference signals will be transmitted to the AAS. Each UE will perform channel quality measurement and based on measurement results, it will feed back the indication information about whether to perform a multiple vertical precoding information feedback. In the present disclosure, the multiple vertical precoding information feedback represents feeding back a plurality of vertical precoding matrix indicators for the plurality of columns in the antenna array. The eNB will adjust configuration of the precoding information feedback based on the indication information. Additionally, in the initialization process, the precoding information feedback may be transmitted from each UE based on a default configuration which is known by both the eNB and the UE. Or alternatively, the eNB may initialize a configuration of the precoding information feedback and each UE transmits the precoding information based on the initialized configuration. Therefore, in the initialized process, the 3D CSI composing will be performed based on the PMI feedback which is transmitted based on the default or initialized configuration. Herein, the default or initialized configuration may be the multiple vertical precoding information feedback or a single vertical precoding information feedback that represents feeding back only a single vertical precoding matrix indicator for the plurality of columns in the antenna array.

In a subsequent process, the precoding information feedback will be performed based on the adjusted configuration. For example, the multiple vertical precoding information feedback will be performed if it may obtain a performance gain; otherwise, the single vertical precoding information feedback will be performed.

Figure 3:
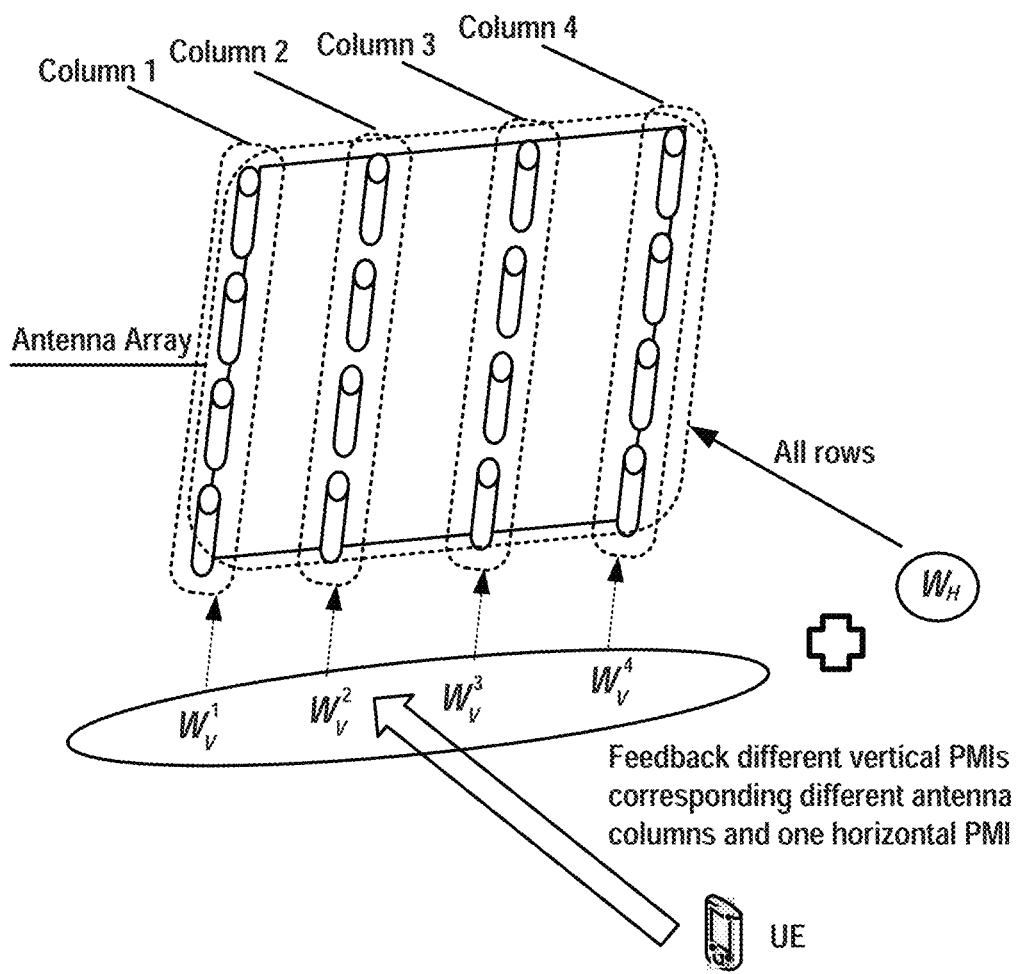
FIG. 3 schematically illustrates a diagram of a multiple vertical precoding information feedback according to an embodiment of the present disclosure.

FIG. 3 schematically illustrates a diagram of a multiple vertical precoding information feedback according to an embodiment of the present disclosure. For a 2D antenna array, if the multiple vertical precoding information feedback is enabled, the precoding information feedback transmitted from the UE will comprise a plurality of vertical precoding matrix indicators respectively for a plurality of columns in the antenna array and one horizontal precoding matrix indicator. As illustrated in FIG. 3, a 2D antenna array including four rows and four columns is illustrated. As far as the 2D antenna array is concerned, the PMI feedback may comprise four vertical PMIs ($W_V^1$, $W_V^2$, $W_V^3$, and $W_V^4$) for the four columns and one horizontal PMI ($W_H$) for the four rows. While if the multiple vertical precoding information feedback is disabled, a single vertical precoding information feedback will be preformed, i.e., the precoding information feedback transmitted from the UE will comprise only one vertical precoding matrix indicator and one horizontal precoding matrix indicator.

Next, reference will be made to FIG. 4 to describe a method for channel estimation and feedback in a 3D-MIMO system as provided in the present disclosure. It may be appreciated that the method may be performed at a serving node such as eNB.

Figure 4:
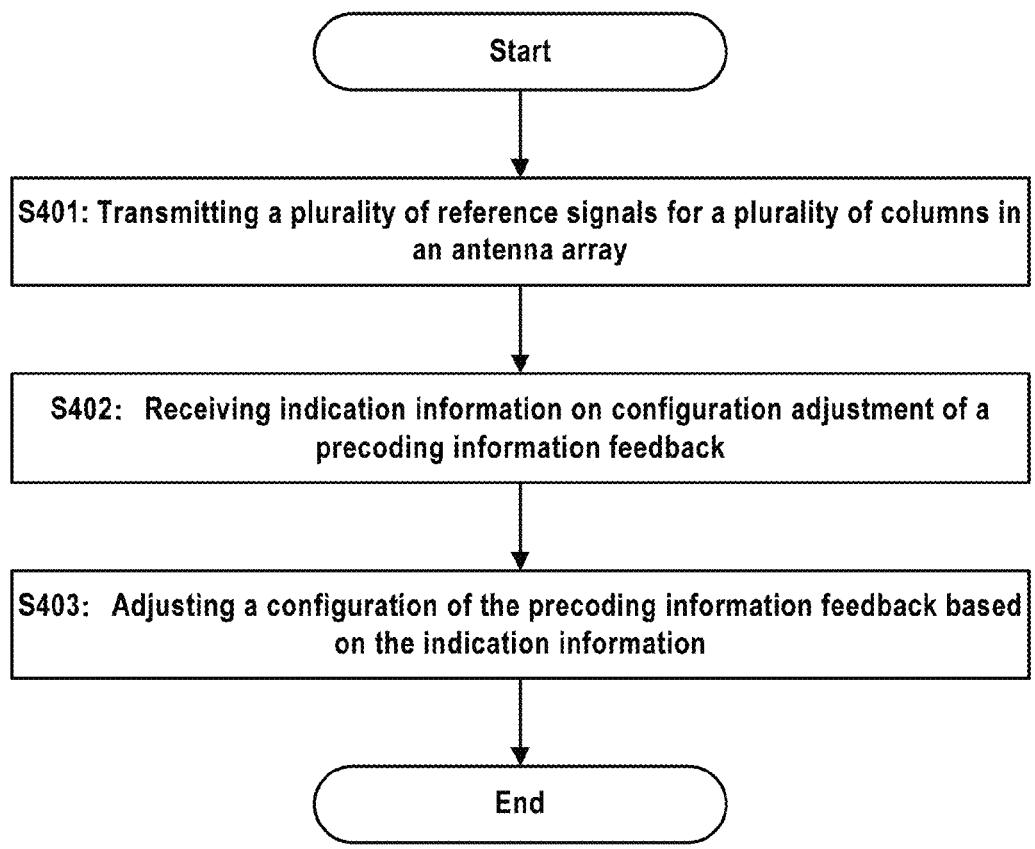
FIG. 4 schematically illustrates a flowchart of a method for channel estimation and feedback in a 3D-MIMO system according to an embodiment of the present disclosure.

As illustrated in FIG. 4, first at step S401, a plurality of reference signals for a plurality of columns in an antenna array may be transmitted from an eNB to a UE.

In all 3D precoding solutions as disclosed in the prior art, only one column of reference signals corresponding one column in an antenna array and one row of reference signals corresponding to one row in the antenna array are transmitted to the UE. It means that it does not consider influences from a horizontal plane when the UE calculates a vertical PMI. In other word, the vertical CSI is calculated without considering any horizontal precoding process. Accordingly, it might lead to a large estimation error for 3D channel measurement.

Furthermore, for a large space of different antenna columns, horizontal antenna position will have an influence on the vertical channel as well. Thus, the vertical channel characteristic of different antenna columns may be different. Therefore, it might be not suitable to apply the same vertical codeword to all columns anymore.

Just based on such an understanding, in the present disclosure, there is proposed to transmit a plurality of reference signals for a plurality of columns in an antenna array to a UE.

The eNB may transmit a reference signal to each column in the antenna array. However, the present disclosure is not limited thereto, i.e., it is not necessary for the eNB to transmit a reference signal to each column in the antenna array. It may only transmit reference signals for a part of columns in the antenna array, for example, those with a large space (column with a space larger than a predetermined threshold). For example, reference signals may be allocated only for each of columns on both sides of the antenna planar, or be allocated intermittently from left column to the right of the antenna array.

Besides, the reference signal can be any signal which may be used for channel measurement in downlink, e.g. CSI-RS, CRS, and so on. The reference signal used for channel quality measurement for different columns of antenna array can be transmitted in the same subframe or in different subframes. On the other hand, for all rows in the antenna array corresponding to the horizontal plane, the eNB may transmit the same one reference signal.

Then, at step S402, the eNB may receive indication information on configuration adjustment of a precoding information feedback from the UE, wherein the indication information is based on measurement on the plurality of reference signals.

Figure 5:
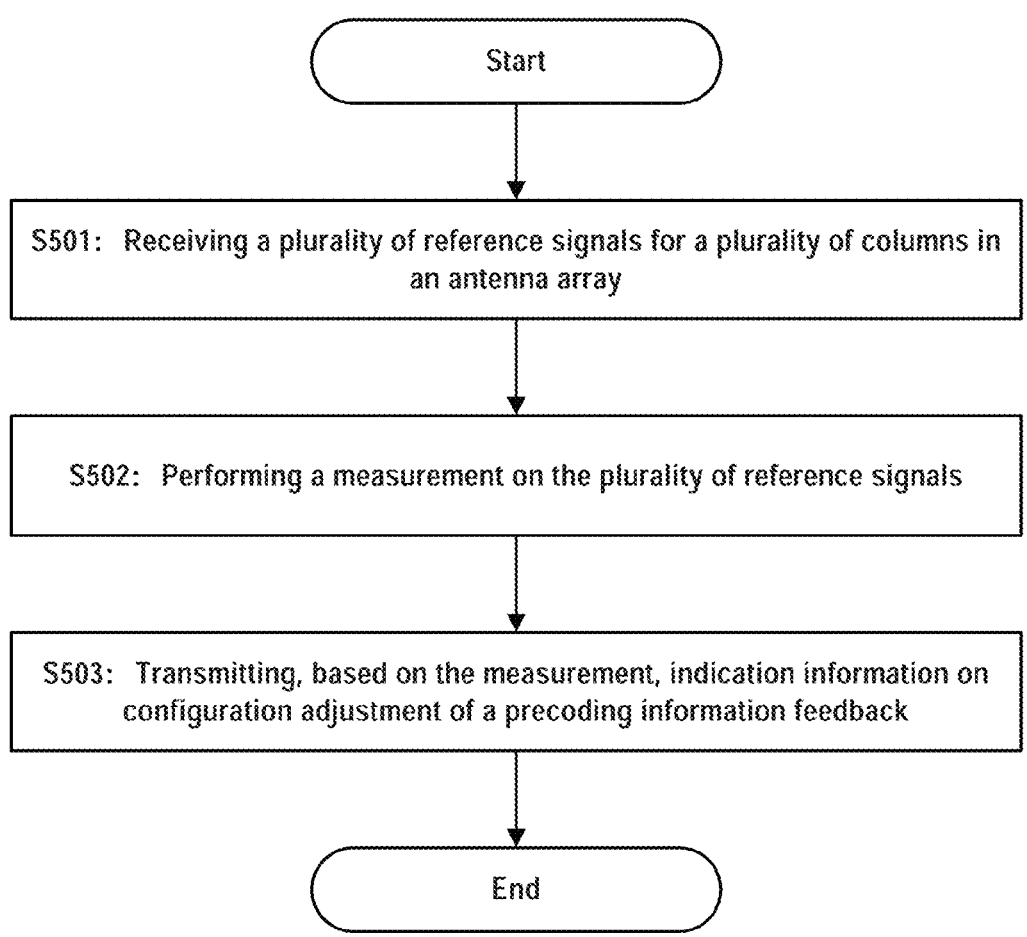
FIG. 5 schematically illustrates a flowchart of a method for channel estimation and feedback in a 3D-MIMO system according to another embodiment of the present disclosure.

After those reference signals are transmitted to the UE, the UE will perform a measurement on the reference signals and feed back indication information on configuration adjustment of the precoding information feedback, which will be detailed hereinafter with reference to FIG. 5.

The indication information may indicate whether a multiple vertical precoding information feedback can obtain a performance gain. Actually, the indication information may be in an explicit fashion or an implicit fashion. Regarding the explicit fashion, there may be provided an additional bit in channel quality feedback information from the user equipment and the indication information may be contained in the additional bit. As regards the implicit fashion, there are at least two candidates:

1) It may use rank indicator (RI). This is a rather good choice for the indication information. The multiple vertical PMIs can both impact vertical and horizontal channel characteristic and it may enhance granularity 3D spatial multiplexing and introduce more rank for the UE. Moreover, it may introduce more gains for UEs which have a higher rank. Thus, it means that a higher rank (rank 2, for example) may be used to indicate the multiple vertical PMI feedback may obtain performance gain.

2) The indication information may be indicated by whether the same vertical codewords are transmitted for the plurality of columns in the antenna array. For embodiments in which the default or initialized configuration is the multiple vertical precoding information feedback, if the UE determines that the multiple vertical precoding information feedback can not obtain any performance gain, it may feed back multiple vertical PMIs with the same indicator for the plurality of columns in the antenna array to inform the eNB that the multiple vertical precoding information feedback can not obtain performance gain.

Additionally, the indication information may also be a resource request that asks the eNB for uplink resource of the multiple vertical precoding information feedback. If the UE determines that the multiple vertical precoding information feedback can obtain a performance gain, it may send a resource request to the UE to ask for uplink resource of the multiple vertical precoding information feedback. By means of the resource request, it may inform the eNB of the indication information on configuration adjustment.

Next, at step S403, a configuration of the precoding information feedback is adjusted based on the indication information so that a multiple vertical precoding information feedback is enabled when it can obtain a performance gain.

In embodiments of the present disclosure in which the indication information indicates whether a multiple vertical precoding information feedback can obtain a performance gain and the default configuration is the single vertical precoding information feedback, it may change, in response to the indication information indicating that it can obtain a performance gain, the configuration as the multiple vertical precoding information feedback, and keep it unchanged when the indication information indicating that it can obtain not a performance gain. On the other hand, if the default configuration is the multiple vertical precoding information feedback, it may keep it unchanged in response to the indication information indicating that it can obtain a performance gain, and change the configuration as the single vertical precoding information feedback if the indication information indicates that it can not obtain a performance gain.

Additionally, the configuration may also be adjusted when the obtained performance is larger than a predetermined threshold. In some cases, the obtained performance gain may be so small that it is not worth to perform the multiple vertical precoding information feedback. By determining whether the obtained performance is higher than a predetermined threshold, it may avoid these cases. Accordingly, in en embodiment, the indication information may indicate whether the performance gain obtained by the multiple vertical precoding information feedback is higher than a predetermined threshold.

As mentioned hereinbefore, the indication information may be a resource request for uplink resource of the multiple vertical precoding information feedback. Then in embodiments in which the default configuration is the single vertical precoding information feedback, if such a resource request is received, the configuration may be changed so that the multiple vertical precoding information feedback is enabled, and at the same time the eNB may schedule the required uplink resource for the UE; and if the eNB does not receive such a resource request, the eNB may keep the configuration intact. On the other hand, in embodiments in which the default configuration is the multiple vertical precoding information feedback, the configuration may be kept unchanged if the eNB receives such a source request and thus the multiple vertical precoding information feedback is enabled, and at the same time the eNB may schedule the required uplink resource for the UE; and if the eNB does not receive the resource request for the UE. the configuration may be changed as the single vertical precoding information feedback Hereinafter, a method for channel estimation and feedback in a 3D-MIMO system which is preformed at a UE will be described in detail with reference to FIG. 5.

As illustrated, at step S501, the UE receives a plurality of reference signals for a plurality of columns in an antenna array. As mentioned hereinbefore, to take influences on the vertical plane from the horizontal plane, the eNB transmits a plurality of reference signals for a plurality of columns in an antenna array. Accordingly, the UE will receive the reference signals for the plurality of columns in antenna array. Then at step S502, measurements are preformed on these reference signals to learn the channel quality. The channel quality measurement is well-known in the art and thus detailed operation of the measurement is omitted for a purpose of not obscuring the present disclosure. However, to obtain the indication information on configuration adjustment, it may obtain channel quality (SINR or throughput, for example) in different configurations, i.e., in the single vertical precoding information feedback and in the multiple vertical precoding information feedback, and determine whether it may achieve a better channel quality when the multiple vertical precoding information feedback is performed.

At step S503, the UE transmits, based on the measurement, indication information on configuration adjustment of a precoding information feedback.

As mentioned hereinbefore, the indication information may be in an explicit fashion or an implicit fashion. For example, the indication information may be contained in an additional bit in the channel quality feedback. In addition, the indication information may be indicated by a rank indicator implicitly. In a case in which the default or initialized configuration is the multiple vertical precoding information feedback, the indication information may also be indicated by whether the same vertical codewords are transmitted for the plurality of columns in the antenna array. Additionally, the UE may also transmit to the eNB a resource request that asks the eNB for uplink resource of the multiple vertical precoding information feedback if it determines that the multiple vertical precoding information feedback can obtain a performance gain.

It may be seen that compared to the single vertical precoding information feedback, the multiple vertical precoding information feedback require the UE to feed back more vertical PMIs, and thus the corresponding overhead is increased. The inventors notice that it may include some redundancy if PMIs for different columns/rows are correlated with each other.

To reduce the redundancy and reduce the overhead, there is proposed several designs. As an option, it may limit the size of vertical in a predetermined range. For example, codewords that point to non-preferred directions can be eliminated from the vertical codebook.

Figure 6:
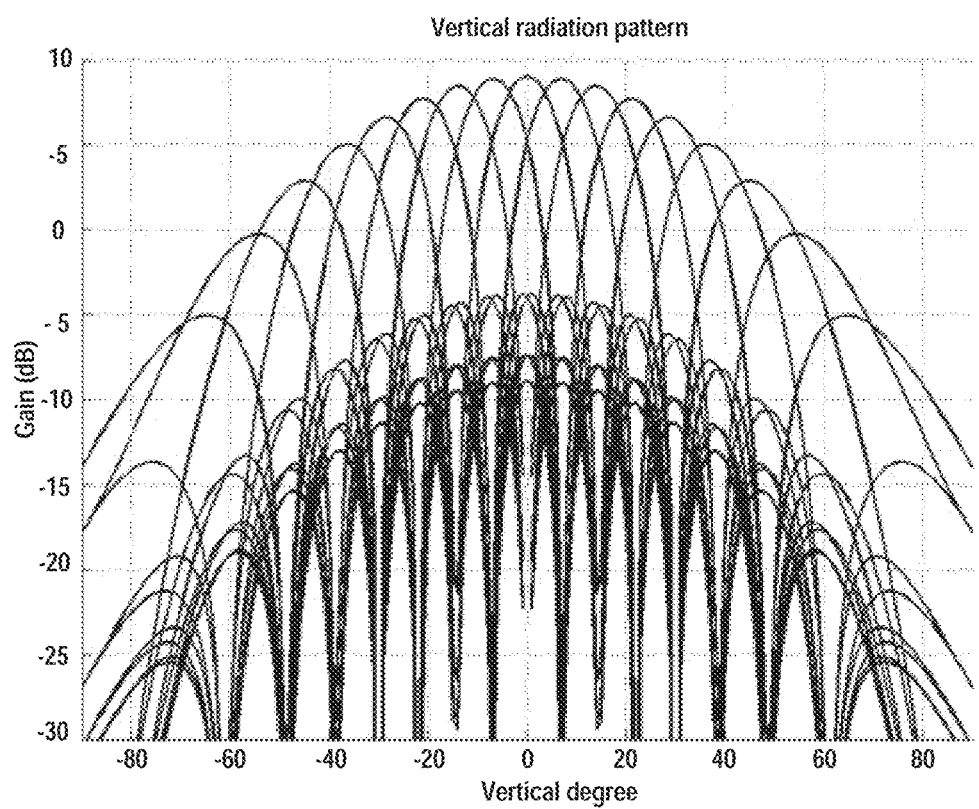
FIG. 6 schematically illustrates a diagram of vertical antenna pattern of 8 elements by 16 DFT codebook.

In embodiments of the present disclosure, the vertical codebook can be constructed by, for example, a DFT method. The vertical codebook may be constructed to contain different codeword corresponding different vertical direction. FIG. 6 illustrates a vertical antenna pattern of 8 elements by a 16 DFT codebook. As illustrated in FIG. 6, actually, the UE can not be located nearby the eNB, and also the UE's height can not exceed a certain limit in general. Therefore, according to distribution of UEs in vertical domain and characteristic of small ESD, the vertical codeword directions can be limited in a range which is smaller than 180 degree, i.e. some codewords (of which directions can not be used or not usually be used, these codewords corresponding too high or too low directions) may be eliminated from the DFT codebook for all UEs.

The DFT-based codebook may be expressed by the following equation:

$$P(m, n) = \frac{1}{\sqrt{n_V}} \exp\left(j\frac{2\pi}{N}mn\right), m = 0, 1, \ldots n_V - 1; n = 0, 1, \ldots N$$

wherein m denotes the number of elements; n denotes a codeword number, and N denotes a DFT length.

Besides, it should be noted that the vertical codebook can also be designed that one PMI index represents vertical PMIs for different columns.

Usually, it may choose the same vertical codeword for different columns of antenna array or chose a near vertical codeword because of correlation of antenna elements. That is to say, different codeword corresponding different columns of antenna array often choose codewords which have nearby directions, or not too far directions.

Thus, the UE can feedback a PMI corresponding to one of antenna array columns and PMI offsets corresponding to remaining columns relative to the PMI. The PMIs for the remaining columns may be composed based on the PMI and the corresponding PMI offsets.

Additionally, the UE can feedback a wideband PMI and PMI offset corresponding to columns in the antenna array relative to the wideband. Similarly, the PMIs for the columns may be composed based on the wideband PMI and the responding PMI offsets.

Herein, the term "PMI offset" denotes is a codeword index offset which represent offset of codeword direction, i.e., a codeword direction offset. A PMI level for a column may be determined by one reference PMI and a PMI offset. In view of the fact that bits of each offset is lower than the number of PMI bits, the overhead may be reduce greatly.

The following table shows an example relationship between a PMI offset and codeword direction offset.

TABLE 1

| PMI Offset and codeword direction offset | |
|---|---|
| PMI offset | Code word direction offset |
| 0 | No offset |
| 1 | Shift one index to right |
| −1 | Shift one index to left |
| 2 | Shift two index to right |
| … | … |

In fact, when the eNB has configured the feedback configuration as the multiple vertical precoding information feedback, index 0 of PMI offset candidates may be eliminated.

Hereinafter, to make the skilled in the art understand the whole process of the channel estimation and feedback completely and thoroughly, reference will be made to FIG. 7 to describe the exemplary process.

Figure 7:
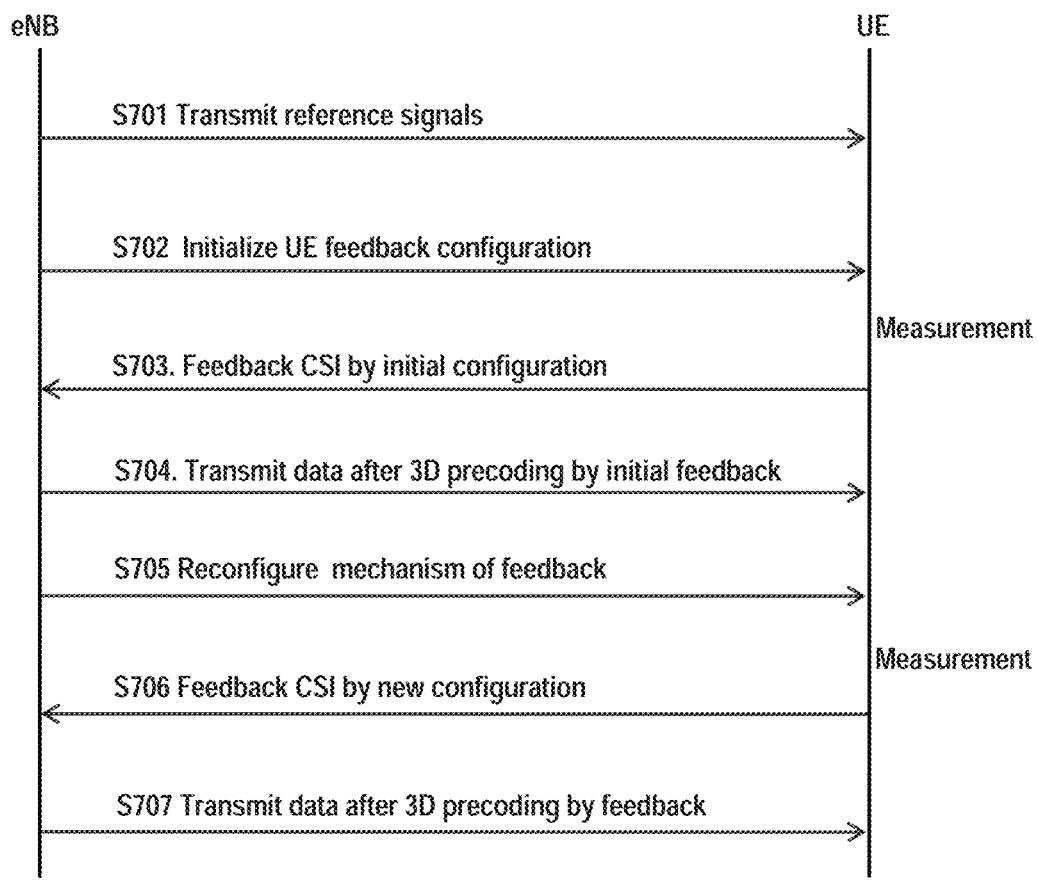
FIG. 7 schematically illustrates a signaling flowchart for channel estimation and feedback in a 3D-MIMO system according to an embodiment of the present disclosure.

FIG. 7 schematically illustrates a signaling flowchart channel estimation and feedback in a 3D-MIMO system according to an embodiment of the present disclosure. As illustrated, at step S701, the eNB transmits reference signals to the UE. The reference signals comprise a plurality of signal for a plurality of columns in an antenna array so as to consider an impact of the horizontal plane on the vertical plane. At this time, the eNB can not learn any information about whether it is suitable to perform the multiple precoding information feedback. Thus, the eNB may initialize a configuration of the PMI feedback at step S702. For example, the eNB may configure the UE to feed back multiple vertical PMIs corresponding to multiple columns in the antenna array and only one horizontal PMI for all rows in the antenna array. In addition, as described hereinabove, it may be configured to a single vertical precoding information feedback as well. Moreover, it is also possible to use a default configuration instead of performing an initialization. Thus, it may be appreciated that step S702 is an optional step.

After receiving the reference signals and the initialized configuration, the UE performs measurements on the received reference signals so as to learn channel conditions. Based on measurement results, the UE may determine whether the multiple vertical precoding information feedback can obtain a performance gain. Specifically, the UE may obtain channel quality (SINR or throughput, for example) in different configurations, i.e., in the single vertical precoding information feedback and in the multiple vertical precoding information feedback, and determine whether it may achieve a better channel quality when the multiple vertical precoding information feedback is performed.

Then, at step S703, a channel quality feedback will be transmitted from the UE to the eNB based on the initialized configuration. The UE may feed back multiple vertical PMIs, one horizontal PMI and another CSI to the eNB. Besides, indication information on configuration adjustment of the precoding information feedback may be transmitted to the eNB as well. For example, the UE may inform the eNB of the indication information in an explicit manner, for example through an extra bit contained in the channel quality feedback. Or alternatively, the UE may provide the indication information to the eNB in an implicit manner. For example, the rank indicator may be used to inform the indication information, or the indication information may be represented by whether the same vertical codeword is fed back for a plurality of columns. For example, if the same vertical codeword are feed back, it represents that no performance gain can be obtained, otherwise it represents that it may obtain performance gain. As another choice, the UE may send a resource request to the eNB to ask for uplink resource of the multiple vertical precoding information feedback if it may obtain a performance gain.

After receiving the horizontal and vertical PMIs, it may compose the 3D precoding matrix based on the $W_H$ and $W_V$. In the present disclosure, the horizontal vertical PMIs may be denoted be $W_H$ and $W_V$, which may be represented by:

$$W_H = \begin{bmatrix} w_{11} & w_{12} & \cdots & w_{1,r_H} \\ w_{21} & w_{22} & \cdots & w_{2,r_H} \\ \vdots & \vdots & \ddots & \vdots \\ w_{n_H,1} & w_{n_H,2} & \cdots & w_{n_H,r_H} \end{bmatrix}_{n_H \times r_H}$$

$$W_V = [W_V^1 W_V^2 \cdots W_V^{n_H}] = \begin{bmatrix} v_{11} & v_{12} & \cdots & v_{1n_H}^v \\ v_{21} & v_{22} & \cdots & v_{2n_H} \\ \vdots & \vdots & \ddots & \vdots \\ v_{n_V 1} & v_{n_V 2} & \cdots & v_{n_V n_H} \end{bmatrix}_{n_V \times n_H}$$

wherein $n_H$ denotes the total number of transmit columns in the antenna array; $n_V$ denotes the total number of transmit rows in the antenna array; and $r_H$ denotes the rank of horizontal channel. Herein the rank of vertical channel is set as 1.

The 3D precoding matrix may be obtained for example as follows:

$$W = [W_H]_{n_H \times r_H} \oplus [W_V]_{n_v \times n_H} \triangleq$$

$$\begin{bmatrix} w_{11} W_V^1 & w_{12} W_V^1 & \cdots & w_{1,r_H} W_V^1 \\ w_{21} W_V^2 & w_{22} W_V^2 & \cdots & w_{2,r_H} W_V^2 \\ \vdots & \vdots & \ddots & \vdots \\ w_{n_H,1} W_V^{n_H} & w_{n_H,2} W_V^{n_H} & \cdots & w_{n_H,r_H} W_V^{n_H} \end{bmatrix}_{n_H n_v \times r_H}$$

wherein each column in the 3D precoding matrix is orthogonal with any one of the remaining columns. After performing a 3D precoding based on the 3D precoding matrix, the eNB may transmit the precoded data to the UE at step S704.

In some embodiments of the present disclosure wherein reference signals are only transmitted for a part of columns in the antenna array, there are no PMI indicators corresponding to the remaining columns. In such a case, the eNB can determine the PMI direction by interpolation of nearby PMIs, or alternatively, the eNB can directly use the PMI direction of nearby column.

On the other hand, the eNB will re-configure the mechanism of PMI feedback based on the indication information at step S705. For example, if a multiple vertical precoding information feedback may obtain a performance gain, it may configure the UE to perform a multiple vertical precoding information feedback, i.e., feed back multiple vertical PMIs for multiple columns in the antenna array.

Afterwards, the UE may perform measurement and feed back channel quality information based on the new configuration at step S706. Similarly, the eNB will perform a 3D precoding matrix composing based on the feedback and at step S707 transmit data to the UE after the data have been precoded based on the composed 3D precoding matrix.

In addition to these methods as described hereinbefore, there are also provided corresponding apparatuses for channel estimation and feedback in a three dimensional multiple input multiple output system, which will be described with reference to FIGS. 8 and 9.

Figure 8:
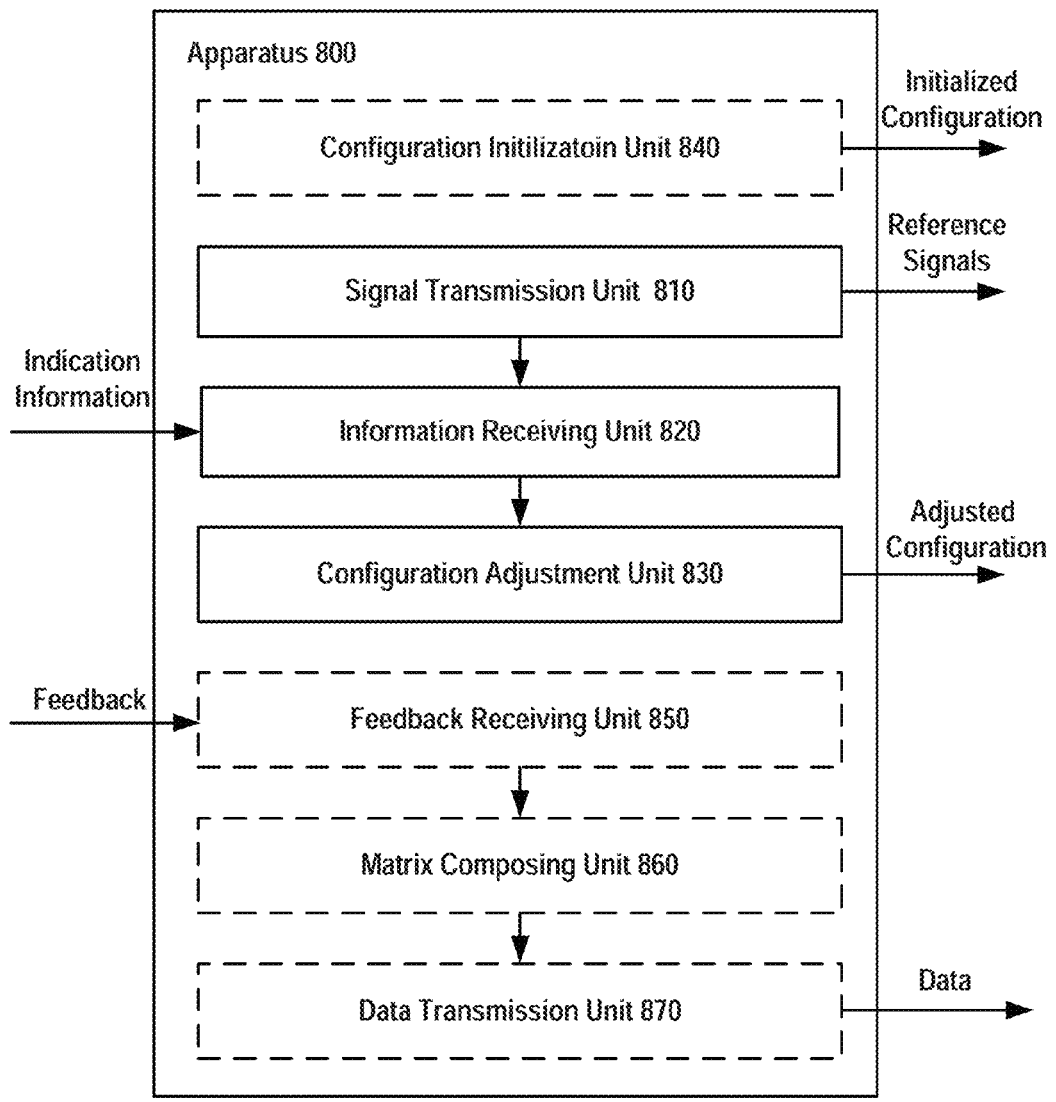
FIG. 8 schematically illustrates a block diagram of an apparatus for channel estimation and feedback in a 3D-MIMO system according to an embodiment of the present disclosure.

FIG. 8 illustrates an apparatus for channel estimation and feedback in a three dimensional multiple input multiple output system, which may be used for the eNB. The apparatus may comprise: a signal transmission unit 810, an information receiving unit 820 and a configuration adjustment unit 830. The signal transmission unit 810 may be configured to transmit a plurality of reference signals for a plurality of columns in an antenna array. The information receiving unit 820 may be configured to receive indication information on configuration adjustment of a precoding information feedback, wherein the indication information is based on measurement on the plurality of reference signals. The configuration adjustment unit 830 may be configured to adjust a configuration of the precoding information feedback based on the indication information so that a multiple vertical precoding information feedback is enabled when it can obtain a performance gain, wherein the multiple vertical precoding information feedback represents feeding back a plurality of vertical precoding matrix indicators for the plurality of columns in the antenna array.

In an embodiment of the present disclosure, the indication information may indicate whether the multiple vertical precoding information feedback can obtain a performance gain. In another embodiment of the present disclosure, the indication information may be a resource request for uplink resource of the multiple vertical precoding information feedback. The indication information is contained in an additional bit of channel quality feedback information from a user equipment. The indication information may also be indicated by a rank indicator, or alternatively, the indication information is indicated by whether the same vertical codewords are fed back for the plurality of columns in the antenna array.

In embodiments of the present disclosure, the plurality of reference signals may be transmitted for a part of columns in the antenna array. For example, the part of columns in the antenna array comprises columns in the antenna array which have a space larger than a predetermined value.

The apparatus 800 may further comprise a configuration initialization unit 840, which may be configured to initialize a configuration of the precoding information feedback. A precoding information feedback that is initially received may be transmitted based on the initialized configuration of the precoding information feedback. The initialized configuration of the precoding information feedback may indicate the UE to feed back only one vertical precoding matrix indicator for the plurality of columns in the antenna array; or indicate the UE to feed back a plurality of vertical precoding matrix indicators for the plurality of columns in the antenna array.

The apparatus 800 may further comprise a feedback receiving unit 850, a matrix composing unit 860 and a data transmission unit 870. The feedback receiving unit 850 may be configured to receive a precoding information feedback containing a plurality of vertical precoding matrix indicators and a horizontal vertical precoding matrix indicator. The matrix composing unit 860 may be configured to compose a three dimensional precoding matrix based on the plurality of vertical precoding matrix indicators and the horizontal vertical precoding matrix indicator contained in the received precoding information feedback. The data transmission unit 870 may be configured to transmit data after being precoded based on the three dimensional precoding matrix.

In the apparatus 800, the matrix composing unit 860 may be configured to determine, for a column in the antenna array which has no corresponding vertical precoding matrix indicator, a direction of the vertical precoding matrix indicator for the column by interpolating precoding matrix indicators of columns near the column. Or alternatively, the matrix composing unit 860 may be configured to determine the direction of the vertical precoding matrix indicator for the column as a precoding matrix indicator of a column near the column.

Besides, to reduce overhead, the vertical codebook for a three dimensional precoding has a size limited in a predetermined range. Further, the precoding information feedback may comprise a vertical precoding matrix indicator offset relative to a predetermined precoding matrix indicator.

Figure 9:
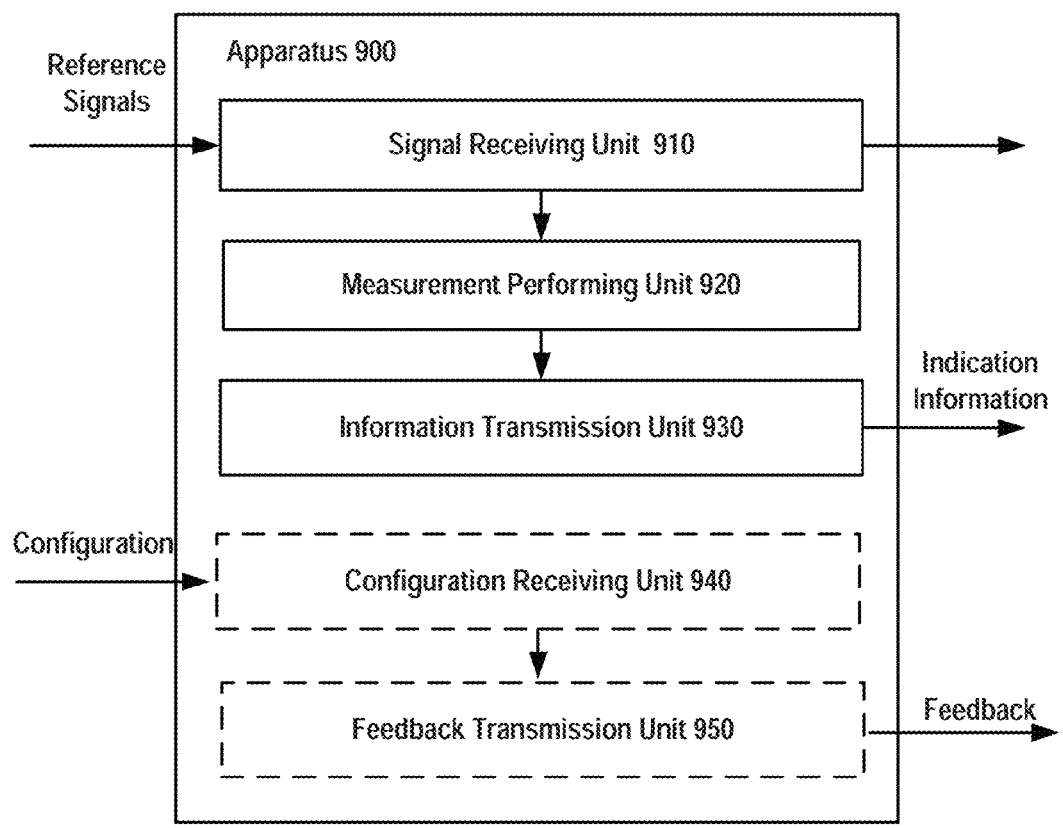
FIG. 9 schematically illustrates a block diagram of an apparatus for channel estimation and feedback in a 3D-MIMO system according to another embodiment of the present disclosure.

FIG. 9 illustrates an apparatus for channel estimation and feedback in a three dimensional multiple input multiple output system, which may be used for the UE. As illustrated, the apparatus 900 may comprise a signal receiving unit 910, a measurement performing unit 920 and an information transmission unit 930. The signal receiving unit 910 may be configured to receive a plurality of reference signals for a plurality of columns in an antenna array. The measurement performing unit 920 may be configured to perform a measurement on the plurality of reference signals. The information transmission unit 930 may be configured to transmit, based on the measurement, indication information on configuration adjustment of a precoding information feedback In embodiments of the present disclosure, the indication information indicates whether a multiple vertical precoding information feedback can obtain a performance gain. The multiple vertical precoding information feedback may represent feeding back a plurality of vertical precoding matrix indicators for the plurality of columns in the antenna array. The indication information may also be a resource request for uplink resource of the multiple vertical precoding information feedback.

In embodiments of the present disclosure, the indication information transmission unit is configured to: contain the indication information in an additional bit of channel quality feedback information; or indicate the indication information by a rank indicator; or indicate the indication information by whether the same vertical codewords are transmitted for the plurality of columns in the antenna array.

Besides, the apparatus 900 may further comprise a configuration receiving unit 940 and a feedback transmission unit 950. The configuration receiving unit 940 may be configured to receive an initialized configuration of the precoding information feedback. The feedback transmission unit 950 may be configured to initially transmit the precoding information feedback based on the initialized configuration of the precoding information feedback. Additionally, the configuration receiving unit 940 may be further configured to receive the adjusted configuration of the precoding information feedback. The feedback transmission unit 950 may be further configured to transmit, based on the adjusted configuration of the precoding information feedback, a precoding information feedback containing a plurality of vertical precoding matrix indicators for the plurality of columns in the antenna array.

In addition, a vertical codebook for a three dimensional precoding may have a size limited in a predetermined range. Moreover, the precoding information feedback may comprise a vertical precoding matrix indicator offset relative to a predetermined precoding matrix indicator.

FIGS. 10A to 10E further illustrate simulation results made on an embodiment of the present invention and the existing solution in the prior art. Parameters used in the simulations are listed in Table 1.

TABLE 2

| Parameters used in the simulations | |
|---|---|
| Parameter | Values |
| System bandwidth | 10 MHz |
| Simulation scenario | UMa |
| Antenna configuration | 8 × 2, low correlation |
| | Vertical antenna space is 0.8 lambda |
| | Horizontal antenna space is 0.5/4 lambda |
| Channel model | 3D channel model based on winner+ |
| Feedback scheme | Wideband PMI feedback |
| | Rank adaption |
| Transmission mode | TM9 |
| Channel estimation | ideal |
| UE distribution | Uniformly distributed with an average and variation range |
| | Average number of floor: |
| | 6 for both UMa and UMi |
| | Variation range: [−2 to 2] |
| Electrical down-tilt | 9 degree |
| For art 0 | Ideal channel for CQI and PMI |
| | the same vertical codeword for whole array |
| For art 2/3 | Ideal channel for CQI |
| | Ideal channel for PMI, but just use first column and row. |

In these simulations, the scheme as proposed in the present disclosure, the solution as disclosed in WO2013/024351 A1 and the solution as disclosed in R1-112420 are simulated and are respectively denoted by Sch 1, Art 1 and Art 2 in theses figures.

Figure 10A:
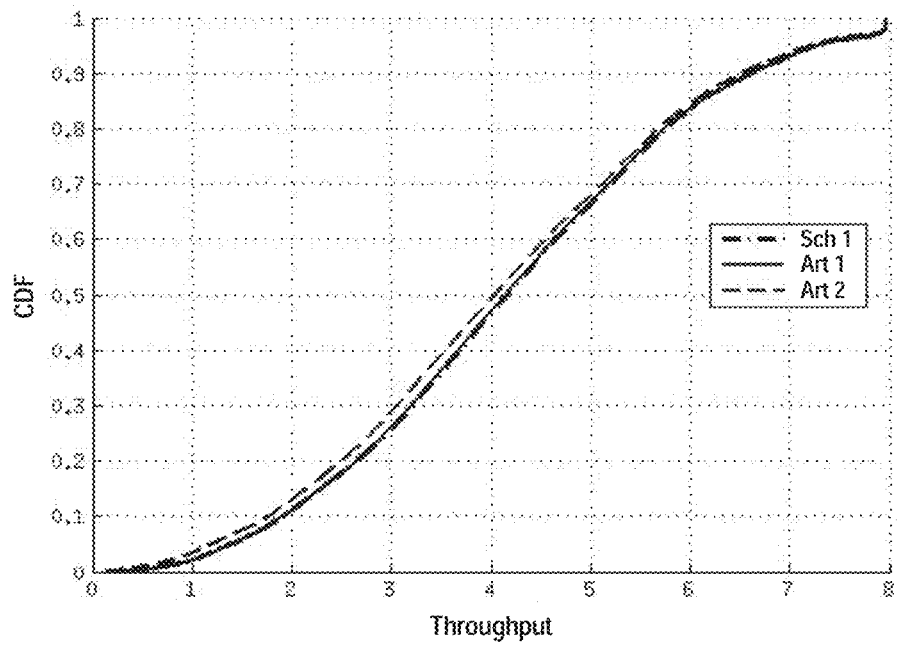
FIGS. 10A to 10D schematically illustrate throughput cumulative distribution function (CDF) curves of UEs under difference circumstances.
Figure 10B:
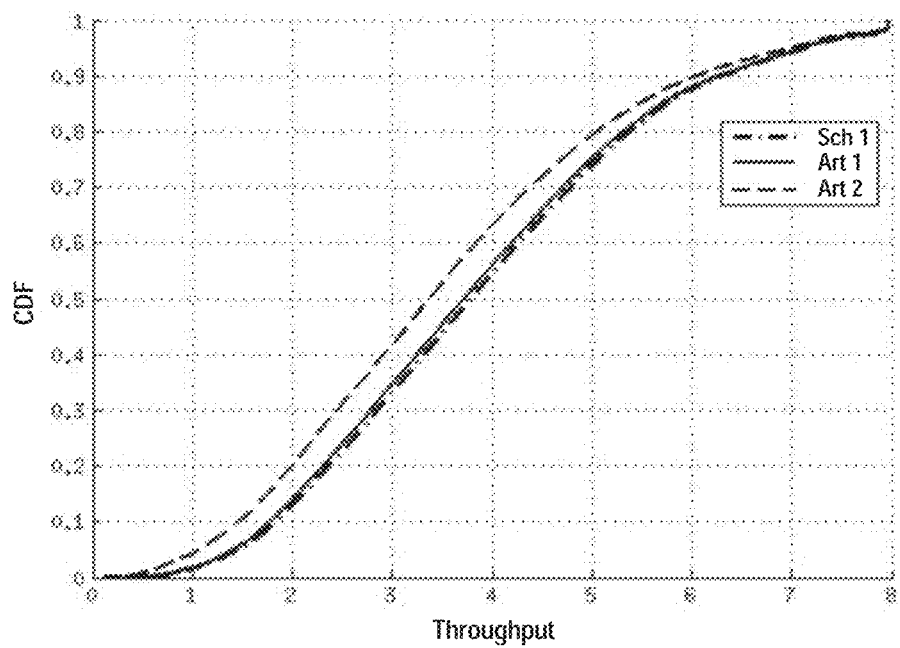

FIGS. 10A and 10B illustrate a throughput CDF with 0.5λ space and 4λ space in a case of 0.5lamda rank 1 and the mean gains obtained by Sch 1 are given in table 3.

TABLE 3

| Mean gains over the prior art | | |
|---|---|---|
| | 0.5λ space | 4λ space |
| Over Art 1 | 0.27% | 1.3% |
| Over Art 2 | 2.8% | 8.5% |

From the two figures and table 3, it may be seen that the proposed solution in the present disclosure may achieve a somewhat performance improvement compared to Art 1 and Art 2 in the prior art, and the larger space the antenna array has, the greater performance improvement it may achieve.

Figure 10C:
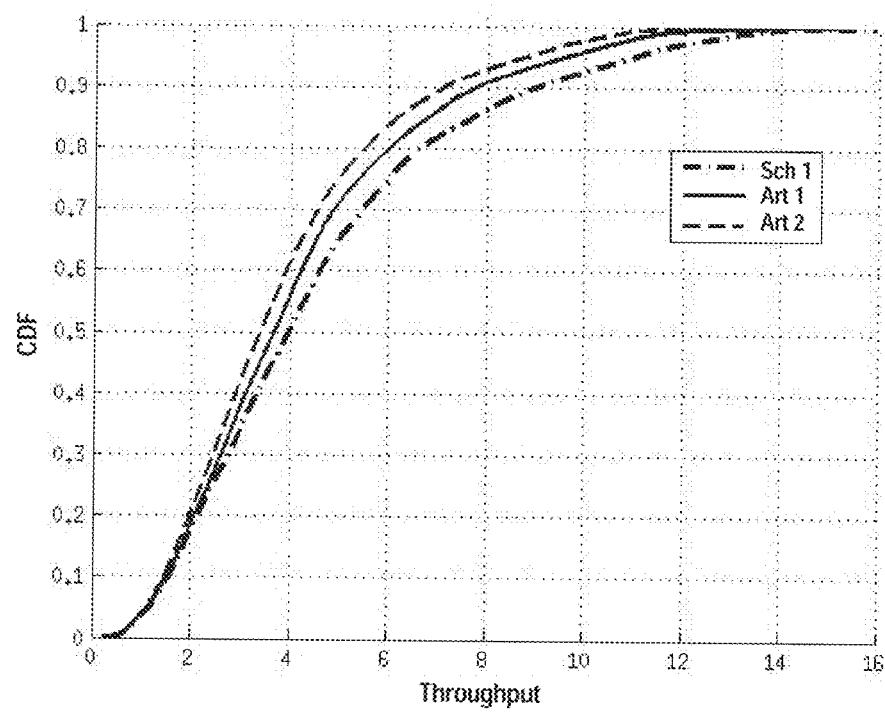
Figure 10D:
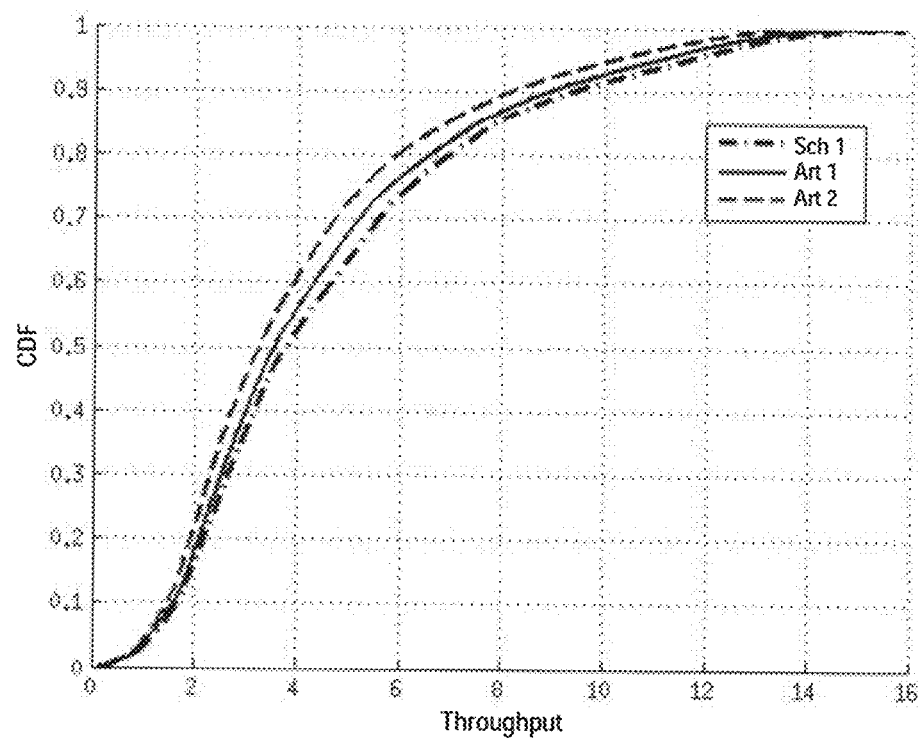

FIGS. 10C and 10D illustrate a throughput CDF with 0.5λ space and 4λ space in a case of 0.5lamda rank 2 and the mean gains obtained by Sch 1 are given in table 4.

TABLE 4

| Mean gains over the prior art | | |
|---|---|---|
| | 0.5λ space | 4λ space |
| Over Art 1 | 11% | 6% |
| Over Art 2 | 19% | 15% |

From FIGS. 10C and 10D, it may be seen that the proposed solution in the present disclosure may achieve a remarkable improvement compared to Art 1 and Art 2. This means it is much suitable to adopt the multiple vertical precoding information feedback for a higher rank, such as rank 2.

Figure 10E:
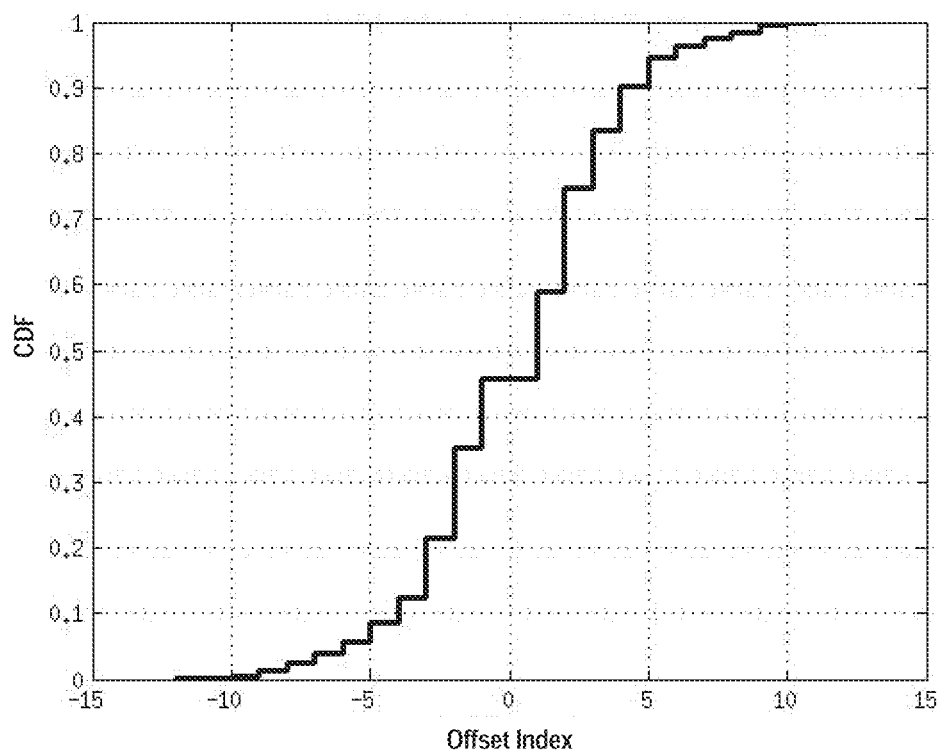
FIG. 10E schematically illustrate PMI offset CDF for columns in an antenna array.

FIG. 10E illustrates PMI offset CDF for different columns in the antenna array. From the simulation results, most of PMIs have offset from −5 to 5, which means most of them are correlated. Thus, it is clear that the use of the PMI offset may reduce the overhead substantially.

Therefore, in embodiments of the present disclosure, there is provided a new solution for channel estimation and feedback in a 3D-MIMO system, and it may achieve a more accurate beamforming and/or a higher order spatial multiplexing, thereby improving the performance of the 3D-MIMO system.

It should be appreciated that embodiments of the present disclosure has been described hereinbefore with reference to the exemplary system. However, based on the teaching herein, the skilled in the art can also apply the solution as proposed in the present disclosure in a system with a structure different from the exemplary system.

It should also be appreciated that, although some operations are described in a single step, unit or module, they might also be performed in separate steps, units or modules. On the other hand, some operations which have been described in separate steps, units or modules may be performed in a single step, unit, and module as well.

Additionally, based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in the companying drawings may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for channel estimation and feedback in a three dimensional multiple input multiple output system, comprising:
transmitting a plurality of reference signals for a plurality of columns in an antenna array;
receiving indication information on configuration adjustment of a precoding information feedback, wherein the indication information is based on measurement on the plurality of reference signals; and
adjusting a configuration of the precoding information feedback based on the indication information so that a multiple vertical precoding information feedback is enabled when performance gain is obtainable, wherein the multiple vertical precoding information feedback represents feeding back a plurality of vertical precoding matrix indicators for the plurality of columns in the antenna array,
wherein the plurality of reference signals are transmitted for a art of columns in the antenna array.

2. The method according to claim 1, wherein the part of columns in the antenna array comprises columns in the antenna array which have a space larger than a predetermined value.

3. The method according to claim 2, wherein the part of columns in the antenna array comprises columns located at both sides of the antenna array.

4. The method according to claim 1, further comprising:
initializing a configuration of the precoding information feedback;
wherein a precoding information feedback that is initially received is transmitted based on the initialized configuration of the precoding information feedback.

5. The method according to claim 4, wherein the initialized configuration of the precoding information feedback indicates the UE to
feed back only one vertical precoding matrix indicator for the plurality of columns in the antenna array; or
feed back a plurality of vertical precoding matrix indicators for the plurality of columns in the antenna array.

6. The method according to claim 1, further comprising:
receiving a precoding information feedback containing a plurality of vertical precoding matrix indicators and a horizontal precoding matrix indicator;
composing a three dimensional precoding matrix based on the plurality of vertical precoding matrix indicators and the horizontal precoding matrix indicator contained in the received precoding information feedback; and
transmitting data after being precoded based on the three dimensional precoding matrix.

7. The method according to claim 6, wherein, for a column in the antenna array which has no corresponding vertical precoding matrix indicator, a direction of the vertical precoding matrix indicator for the column is determined:
by interpolating precoding matrix indicators of columns near the column; or
as a precoding matrix indicator of a column near the column.

8. A method for channel estimation and feedback in a three dimensional multiple input multiple output system, comprising:
receiving a plurality of reference signals for a plurality of columns in an antenna array;
performing a measurement on the plurality of reference signals; and
transmitting, based on the measurement, indication information on configuration adjustment of a precoding information feedback,
wherein the plurality of reference signals are transmitted for part of columns in the antenna array.

9. The method according to claim 8, wherein the indication information indicates whether a multiple vertical precoding information feedback can obtain a performance gain, wherein the multiple vertical precoding information feedback represents feeding back a plurality of vertical precoding matrix indicators for the plurality of columns in the antenna array.

10. The method according to claim 8, further comprising:
receiving an initialized configuration of the precoding information feedback;
initially transmitting the precoding information feedback based on the initialized configuration of the precoding information feedback.

11. The method according to any one of claim 8, further comprising:
receiving the adjusted configuration of the precoding information feedback; and
transmitting, based on the adjusted configuration of the precoding information feedback, a precoding information feedback containing a plurality of vertical precoding matrix indicators for the plurality of columns in the antenna array.

12. An apparatus for channel estimation and feedback in a three dimensional multiple input multiple output system, comprising:
a signal transmission unit configured to transmit a plurality of reference signals for a plurality of columns in an antenna array;
an information receiving unit configured to receive indication information on configuration adjustment of a precoding information feedback, wherein the indication information is based on measurement on the plurality of reference signals;
a configuration adjustment unit configured to adjust a configuration of the precoding information feedback based on the indication information so that a multiple vertical precoding information feedback is enabled when a performance gain is obtainable, wherein the multiple vertical precoding information feedback represents feeding back a plurality of vertical precoding matrix indicators for the plurality of columns in the antenna array;
a feedback receiving unit configured to receive a precoding information feedback containing a plurality of vertical precoding matrix indicators and a horizontal precoding matrix indicator;
a matrix composing unit configured to compose a three dimensional precoding matrix based on the plurality of vertical precoding matrix indicators and the horizontal precoding matrix indicator contained in the received precoding information feedback; and
a data transmission unit configured to transmit data after being precoded based on the three dimensional precoding matrix.

13. The apparatus according to claim 12, further comprising:
a configuration initialization unit, configured to initialize a configuration of the precoding information feedback;
wherein a precoding information feedback that is initially received is transmitted based on the initialized configuration of the precoding information feedback.

14. The apparatus according to claim 12, wherein the matrix composing unit is configured to determine, for a column in the antenna array which has no corresponding vertical precoding matrix indicator, a direction of the vertical precoding matrix indicator for the column:
by interpolating precoding matrix indicators of columns near the column; or
as a precoding matrix indicator of a column near the column.

15. An apparatus for channel estimation and feedback in a three dimensional multiple input multiple output system, comprising:
a signal receiving unit configured to receive a plurality of reference signals for a plurality of columns in an antenna array;
a measurement performing unit configured to perform a measurement on the plurality of reference signals; and
an information transmission unit configured to transmit, based on the measurement, indication information on configuration adjustment of a precoding information feedback,
wherein the indication information transmission unit is configured to:
contain the indication information in an additional bit of channel quality feedback information; or indicate the indication information by a rank indicator; or indicate the indication information by whether the same vertical codewords are transmitted for the plurality of columns in the antenna array.

16. The apparatus according to claim 15, further comprising:
- a configuration receiving unit configured to receive an initialized configuration of the precoding information feedback; and
- a feedback transmission unit configured to initially transmit the precoding information feedback based on the initialized configuration of the precoding information feedback.

17. The apparatus according to claim 15, further comprising
- a configuration receiving unit configured to receive the adjusted configuration of the precoding information feedback; and
- a feedback transmission unit configured to transmit, based on the adjusted configuration of the precoding information feedback, a precoding information feedback containing a plurality of vertical precoding matrix indicators for the plurality of columns in the antenna array.

* * * * *